US010962403B2

(12) United States Patent
Konishi (10) Patent No.: US 10,962,403 B2
(45) Date of Patent: Mar. 30, 2021

(54) WEIGHING DEVICE WITH AN ARTICLE SUPPLY CONVEYOR THAT RUNS FOR DIFFERENT LENGTHS OF TIME DEPENDING ON THE DETECTION OF AN ARTICLE HANGING FROM THE END

(71) Applicant: Ishida Co., Ltd., Kyoto (JP)

(72) Inventor: Hiroe Konishi, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 170 days.

(21) Appl. No.: 16/450,563

(22) Filed: Jun. 24, 2019

(65) Prior Publication Data

US 2020/0072655 A1 Mar. 5, 2020

(30) Foreign Application Priority Data

Sep. 4, 2018 (JP) .............................. JP2018-165285

(51) Int. Cl.
*G01G 19/24* (2006.01)
*G01G 19/387* (2006.01)
*G01G 13/24* (2006.01)
*G01G 13/02* (2006.01)

(52) U.S. Cl.
CPC .......... *G01G 13/247* (2013.01); *G01G 13/026* (2013.01); *G01G 19/387* (2013.01)

(58) Field of Classification Search
CPC .... G01G 13/24; G01G 13/247; G01G 13/026; G01G 19/387; G01G 19/393
See application file for complete search history.

(56) References Cited

U.S. PATENT DOCUMENTS 5,270,495 A * 12/1993 Mosher ................ G01G 13/026
177/25.18
5,753,866 A * 5/1998 Ikeda .................... G01G 19/393
177/25.18

(Continued)

FOREIGN PATENT DOCUMENTS

EP 0 112 664 A2 7/1984
EP 3 258 226 A1 12/2017
(Continued)

OTHER PUBLICATIONS

The extended European search report issued by the European Patent Office on Dec. 11, 2019, which corresponds to European Patent Application No. 19177235.9-1001 and is related to U.S. Appl. No. 16/450,563.

*Primary Examiner* — Randy W Gibson
(74) *Attorney, Agent, or Firm* — Studebaker & Brackett PC (57) ABSTRACT

A weighing device includes a conveyance unit which conveys an article, a hopper which receives the article conveyed by the conveyance unit, temporarily holds the article, and then discharges the article downstream, a detection unit which detects the article between a conveyance end of the conveyance unit and the hopper, and a control unit which controls driving of the conveyance unit. When the detection unit does not detect the article at a start of driving of the conveyance unit, the control unit drives the conveyance unit for a first period. When the detection unit detects the article at a start of driving of the conveyance unit, the control unit drives the conveyance unit for a second period longer than the first period.

6 Claims, 5 Drawing Sheets

(56) References Cited

U.S. PATENT DOCUMENTS

| | | | | |
|---|---|---|---|---|
| 8,851,269 B2* | 10/2014 | Hansen | ............... | B65B 57/14 |
| | | | | 198/563 |
| 9,194,735 B2* | 11/2015 | Tamai | ............... | G01G 19/393 |
| 9,651,414 B2* | 5/2017 | Hofer | ............... | G01G 23/3721 |
| 10,132,675 B2* | 11/2018 | Kageyama | ............... | G01G 19/387 |
| 10,533,890 B2* | 1/2020 | Moriwaki | ............... | G01G 11/00 |

FOREIGN PATENT DOCUMENTS

| | | |
|---|---|---|
| JP | 2012-215487 A | 11/2012 |
| JP | 2013-002902 A | 1/2013 |

* cited by examiner

WEIGHING DEVICE WITH AN ARTICLE SUPPLY CONVEYOR THAT RUNS FOR DIFFERENT LENGTHS OF TIME DEPENDING ON THE DETECTION OF AN ARTICLE HANGING FROM THE END

TECHNICAL FIELD

One aspect of the present invention relates to a weighing device.

BACKGROUND

For example, a combination scale described in Japanese Unexamined Patent Publication No. 2013-002902 is known as a weighing device. The combination scale described in Japanese Unexamined Patent Publication No. 2013-002902 includes a conveyance unit which conveys an article (object to be weighed), a hopper (supply hopper) which receives the article conveyed by the conveyance unit, temporarily holds the article, and then supplies the article downstream, and a control unit (calculation control unit) which controls driving of the conveyance unit.

SUMMARY

In general, the conveyance unit of the weighing device described above repeats driving for a predetermined period to convey the article. For example, this type of weighing device is unable to complete supply of the article from a conveyance end to the hopper by one driving of the conveyance unit depending on the type or shape of the article to be conveyed, and therefore may cause such a situation that the article hangs down from the conveyance end and does not smoothly reach the hopper. This situation may be overcome only by increasing the driving period of the conveyance unit repeatedly driven. However, when the driving period increases, a larger amount of articles may be supplied to the hopper in accordance with the increase in the period.

Accordingly, one aspect of the present invention is to provide a weighing device capable of smoothly supplying an appropriate amount of articles to hoppers.

A weighing device according to one aspect of the present invention comprises: a conveyance unit configured to convey an article; a hopper configured to receive the article conveyed by the conveyance unit, temporarily hold the received article, and then discharge the article downstream; a detection unit configured to detect the article between a conveyance end of the conveyance unit and the hopper; and a control unit configured to control driving of the conveyance unit. The control unit drives the conveyance unit for a first period when the detection unit does not detect the article at a start of driving of the conveyance unit. The control unit drives the conveyance unit for a second period longer than the first period when the detection unit detects the article at a start of driving of the conveyance unit.

The weighing device includes the detection unit which detects the article between a conveyance end of the conveyance unit and the hopper. When the article is not detected by the detection unit at a start of driving of the conveyance unit, the conveyance unit is driven for a first period in a normal condition where the article does not hang down from the conveyance end, for example. In this manner, a specified amount of the articles can be supplied to the hoppers. On the other hand, when the article is detected by the detection unit at a start of driving of the conveyance unit, the conveyance unit is driven for a first period longer than a second period in an exceptional condition where the article hangs down from the conveyance end, for example. In this manner, the article can be securely supplied to the hopper. Accordingly, an appropriate amount of the articles can be smoothly supplied to the hoppers.

According to the weighing device of one aspect of the present invention, the second period may be set for each type of the article. In this case, an appropriate amount of the articles can be smoothly supplied to the hoppers in accordance with the type of the article.

According to the weighing device of one aspect of the present invention, the conveyance unit may have a screw feeder configured to include a screw constituted of a linear member. The control unit may control a rotation operation of the screw of the screw feeder. In this manner, the article can be conveyed by the rotation operation of the screw.

According to the weighing device of one aspect of the present invention, the conveyance unit may convey the article in the radiation trough by rotating the screw disposed in the radiation trough. The hopper may receive the article dropped from a downstream end of the radiation trough. The detection unit may be a photoelectric sensor configured to emit light to a position below the downstream end of the radiation trough on the hopper. In this case, a specific configuration capable of supplying an appropriate amount of the articles to the hoppers is realizable.

The weighing device according to one aspect of the present invention may further comprise a different hopper disposed on a downstream side of the hopper, and configured to receive the article discharged from the hopper, temporarily hold the received article, and then discharge the article downstream. The control unit may execute a discharging operation for discharging the article held in the hopper downstream when the article is not held in the different hopper. The control unit may start driving of the conveyance unit after execution of the discharging operation. In this case, driving of the conveyance unit can be controlled in consideration of the holding situation of the different hopper.

According to the weighing device of one aspect of the present invention, the control unit may restart driving of the conveyance unit when the detection unit detects the article after an elapse of a predetermined waiting time from driving of the conveyance unit. In this case, control which gives priority to supplying (feeding) the article to the hopper is achievable.

DETAILED DESCRIPTION

An embodiment will be hereinafter described with reference to the drawings. In the description of the drawings, identical elements are given identical reference numbers, and the same description is not repeated.

Figure 1:
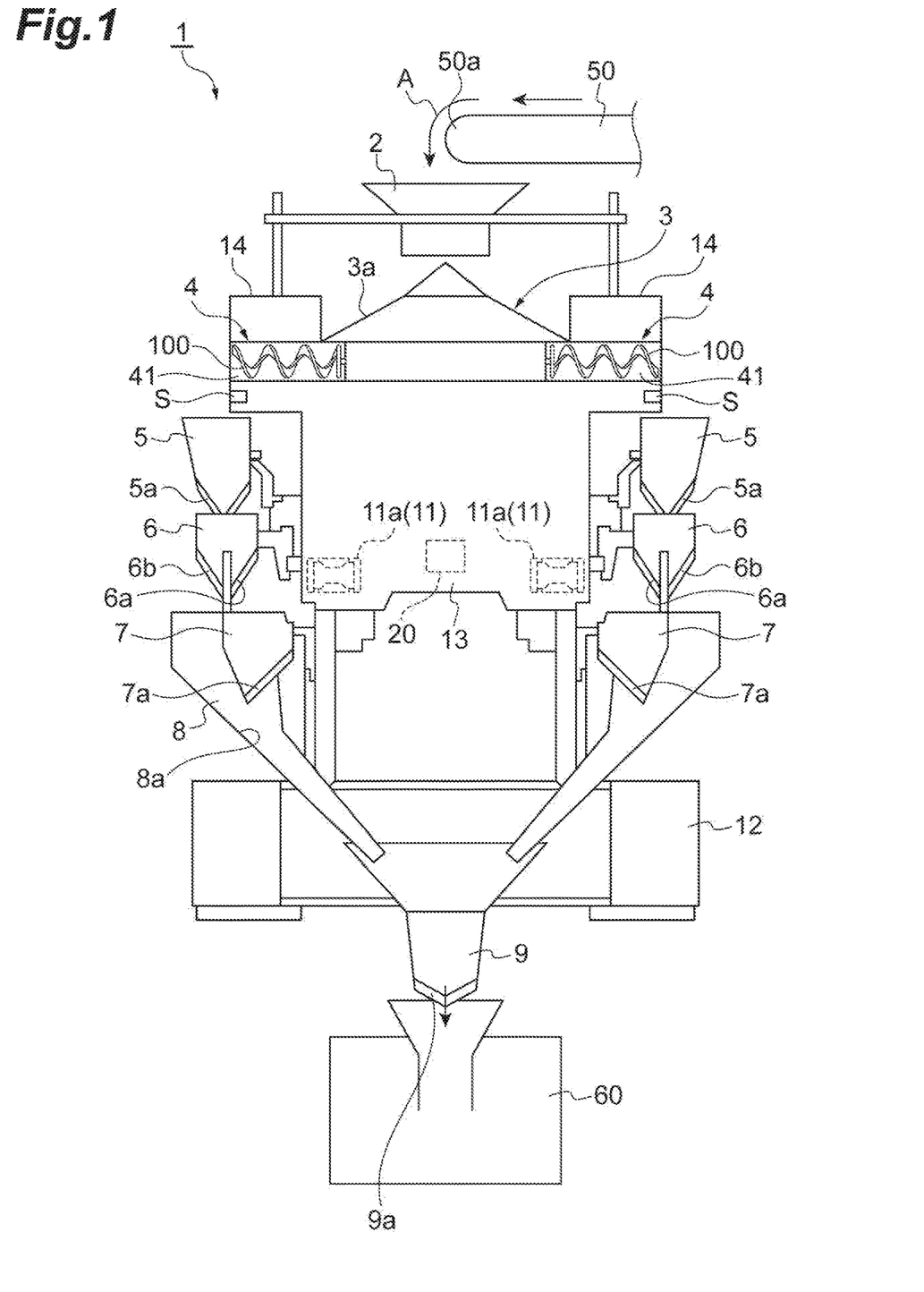
FIG. 1 is a configuration diagram of a combination weighing device according to an embodiment.

As shown in FIG. 1, a combination weighing device 1 is a weighing device which weighs an article A supplied from the outside via a conveyor 50 to adjust a weight of the article A to a target weighing value. The combination weighing device 1 includes a charge chute 2, a dispersion feeder (conveyance unit) 3, a plurality of screw feeders (conveyance unit) 4, a plurality of pool hoppers (hopper) 5, a plurality of weighing hoppers (different hopper) 6, a plurality of booster hoppers 7, a collection chute 8, a timing hopper 9, a weighing unit 11, and a control unit 20.

Examples of the article A include an article (object to be weighed) having variations in single mass, such as agricultural article, marine article, meat, and processed food. Further examples of the article A include an article suitable for the screw feeders 4, such as article fresh meat, processed meat (e.g., chunk of chicken breast, peach meat, and block bacon), dried fruit (e.g., prune), minced meal, and ready meal. The article A is not limited to a particular article, but may be any of various articles.

The charge chute 2 is disposed below a conveyance end 50a of the conveyor 50. The charge chute 2 receives the article A dropped from the conveyance end 50a of the conveyor 50, and discharges the article A downward. The dispersion feeder 3 is disposed below the charge chute 2. The dispersion feeder 3 has a conveyance surface 3a which has a conical shape diverging downward. The dispersion feeder 3 conveys the articles A discharged from the charge chute 2 to a top portion of the conveyance surface 3a such that the articles A uniformly shift toward an outer edge of the conveyance surface 3a by rotating around a rotation axis extending in an up-down direction.

Figure 2:
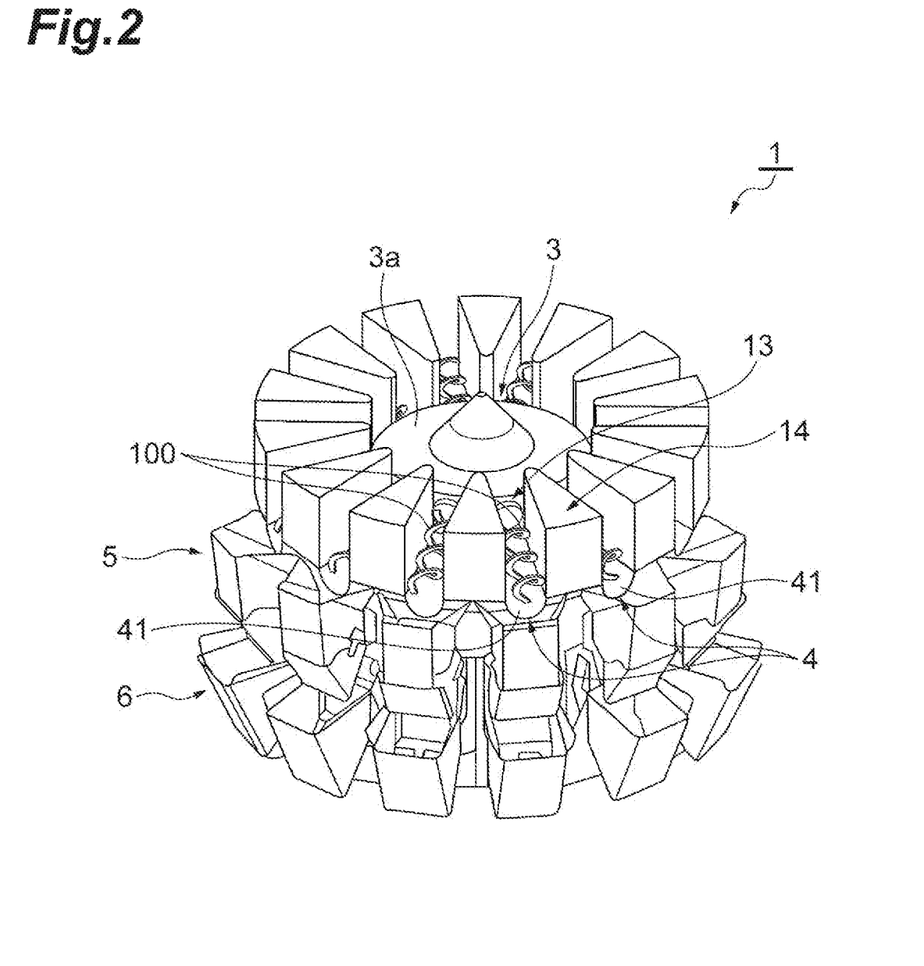
FIG. 2 is a perspective view showing a schematic configuration of the combination weighing device in FIG. 1.

The plurality of screw feeders 4 are radial feeders disposed radially along the outer edge of the conveyance surface 3a of the dispersion feeder 3. Each of the screw feeders 4 includes a radiation trough 41 extending outward from below the outer edge of the conveyance surface 3a toward the pool hopper 5, and a screw 100 disposed in the radiation trough 41. The screw 100 is constituted of a linear member. The screw 100 is not limited to a particular screw, but an Archimedes' screw, for example, may be used. Each of the screw feeders 4 conveys the article A charged into the radiation trough 41 toward the pool hopper 5 by rotation of the screw 100. A guide block 14 is disposed between each pair of the adjacent screw feeders 4 (see FIG. 2). The guide block 14 reduces a drop of the article A between the adjacent screw feeders 4.

Each of the pool hoppers 5 is disposed below a conveyance end of the corresponding screw feeder 4 (i.e., downstream end of radiation trough 41). Each of the pool hoppers 5 has a gate 5a openable and closable for the bottom of the pool hopper 5. Each of the pool hoppers 5 closes the gate 5a to receive the article A conveyed by the corresponding screw feeder 4 (i.e., article A dropped from downstream end of radiation trough 41), and temporarily holds the received article A. Moreover, each of the pool hoppers 5 opens the gate 5a to discharge the temporarily held article A downward (downstream).

Each of the weighing hoppers 6 is disposed below the gate 5a of the corresponding pool hopper 5. Each of the weighing hoppers 6 has a gate 6a and a gate 6b openable and closable for the bottom of the weighing hopper 6. Each of the weighing hoppers 6 closes the gates 6a and 6b to receive the article A discharged from the corresponding pool hopper 5, and temporarily holds the received article A. Moreover, each of the weighing hoppers 6 opens the gate 6a or 6b to discharge the temporarily held article A downward.

Each of the booster hoppers 7 is disposed below the gate 6a of the corresponding weighing hopper 6. Each of the booster hoppers 7 has a gate 7a openable and closable for the bottom of the booster hopper 7. Each of the booster hoppers 7 closes the gate 7a to receive the article A discharged from the gate 6a of the corresponding weighing hopper 6, and temporarily holds the received article A. Moreover, each of the booster hoppers 7 opens the gate 7a to discharge the temporarily held article A downward.

The collection chute 8 has a tubular configuration which includes an inner surface 8a of a truncated cone tapering downward. The collection chute 8 is disposed such that the inner surface 8a is located below all the weighing hoppers 6 and all the booster hoppers 7. The collection chute 8 receives, by the inner surface 8a, the article A discharged from the gate 6b side of each of the weighing hoppers 6, and the article A discharged from each of the booster hoppers 7, and discharges the received article A downward.

The timing hopper 9 is disposed below the collection chute 8. The timing hopper 9 has a gate 9a openable and closable for the bottom of the timing hopper 9. The timing hopper 9 closes the gate 9a to receive the article A discharged from the collection chute 8, and temporarily holds the received article A. Moreover, the timing hopper 9 opens the gate 9a to discharge the temporarily held article A to a bag forming and packaging machine 60. The bag forming and packaging machine 60 packs the article A discharged from the combination weighing device 1 while forming a film into a bag having a predetermined volume.

The weighing unit 11 is disposed in a case 13 supported by a frame 12. When the article A is temporarily held in each of the weighing hoppers 6, the weighing unit 11 measures a weighing value of the article A corresponding to a mass of the article A. The weighing unit 11 has a plurality of load cells 11a. Each of the load cells 11a supports the corresponding weighing hopper 6.

The control unit 20 is disposed in the case 13. The control unit 20 includes a central processing unit (CPU), a read only memory (ROM), a random access memory (RAM), and others. The control unit 20 controls respective parts of the combination weighing device 1. The control unit 20 controls driving of the dispersion feeder, driving of the screw feeders 4 (rotation operation of screws 100), opening and closing operation of the gate 5a of each of the pool hoppers 5, opening and closing operation of the gates 6a and 6b of each of the weighing hoppers 6, opening and closing operation of the gate 7a of each of the booster hoppers 7, and opening and closing operation of the gate 9a of the timing hopper 9, and others. The control unit 20 is communicably connected to the bag forming and packaging machine 60. The control unit 20 outputs driving start signals to the screw feeders 4 to drive the screw feeders 4 in a first period T1 or a second period T2 (details will be described below).

The control unit 20 stores the weighing value measured by the weighing unit 11, and the weighing hopper 6 and/or the booster hopper 7 in which the article A corresponding to the weighing value is held, while associating the weighing value and the weighing hopper 6 and/or the booster hopper 7 with each other. When the article A measured by the weighing unit 11 is discharged to the booster hopper 7, the control unit 20 stores the weighing value of the article A measured by the weighing unit 11 and the booster hopper 7 in association with each other.

The control unit 20 selects such a combination of weighing values a total value of which becomes a target weighing value from a plurality of weighing values measured by the weighing unit 11 and associated with the plurality of weighing hoppers 6 and/or booster hoppers 7. Specifically, the control unit 20 selects, from a plurality of weighing values output from the weighing unit 11, such a combination of weighing values a total value of which falls within a predetermined range having a lower limit corresponding to the target weighing value. Thereafter, the control unit 20 discharges the article A to the weighing hopper 6 and/or the booster hopper 7 associated with the combination.

Note that the charge chute 2, the dispersion feeder 3, the plurality of screw feeders 4, the plurality of pool hoppers 5, and the plurality of weighing hoppers 6 are supported by the case 13 directly or indirectly. The plurality of booster hoppers 7, the collection chute 8, and the timing hopper 9 are supported by the frame 12 directly or indirectly.

A peripheral configuration of the conveyance end of each of the screw feeders 4 will be now described.

Figure 3:
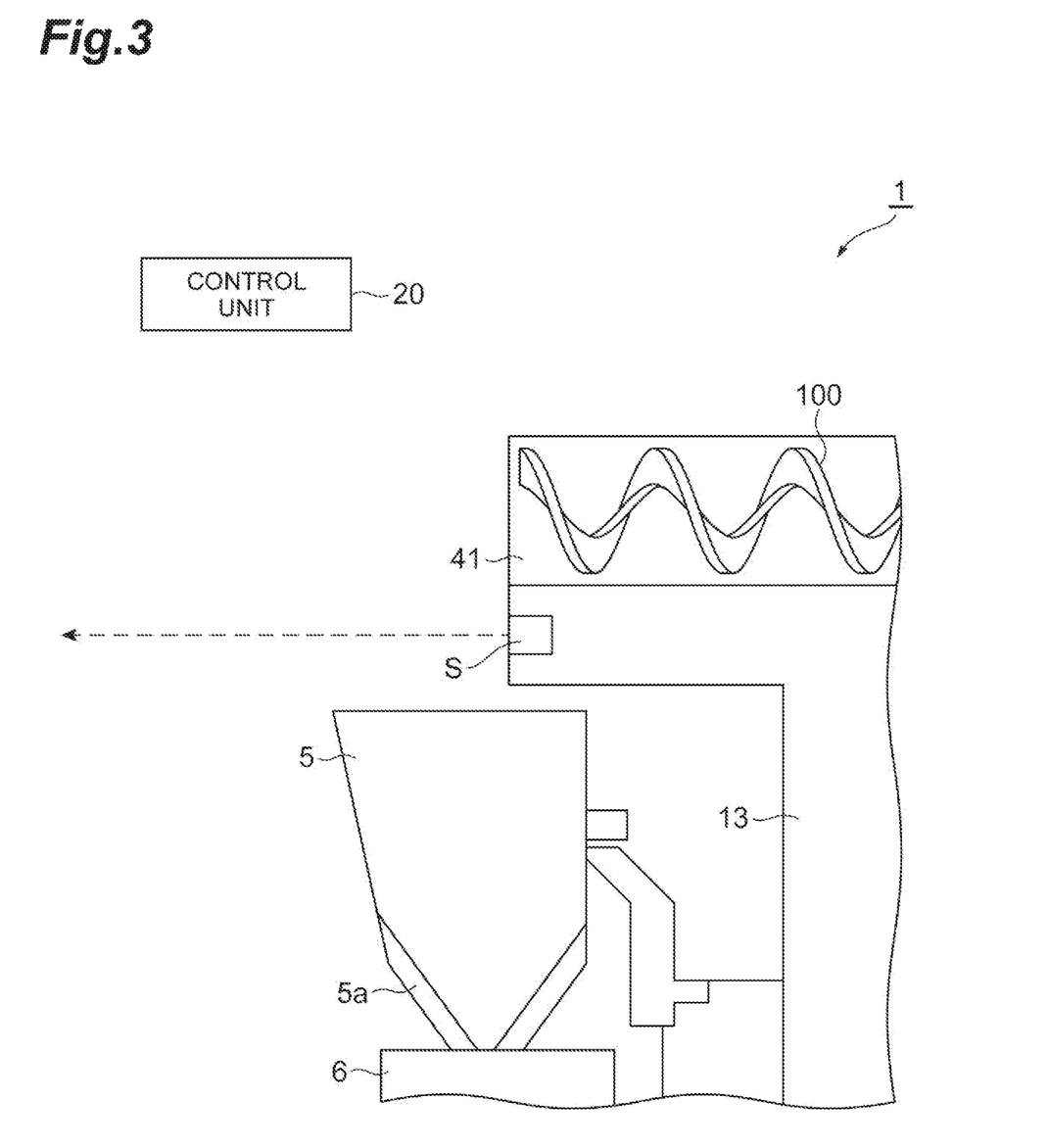
FIG. 3 is a configuration diagram showing a periphery of a conveyance end in a screw feeder in FIG. 1.

As shown in FIG. 3, the combination weighing device 1 includes a photoelectric sensor S as a detection unit which detects the article A between the conveyance end of the screw feeder 4 and the pool hopper 5. A plurality of the photoelectric sensors S are provided. The number of the photoelectric sensors S is equalized with the number of the screw feeders 4 (or pool hoppers 5). Each of the photoelectric sensors S emits light, and detects the light reflected by the article A to detect the article A. For example, each of the photoelectric sensors S outputs an on-signal (or off-signal) when detecting the article A. Note that specifications of the photoelectric sensor S are not particularly limited. Various types of photoelectric sensor may be adopted.

The photoelectric sensor S emits light to a position below the downstream end of the radiation trough 41 on the pool hopper 5. In other words, the photoelectric sensor S emits light in such a manner as to apply the light to the article A dropping from the downstream end of the radiation trough 41 to the pool hopper 5. In the example shown in the figure, the photoelectric sensor S is disposed below the conveyance end of each of the screw feeders 4. The photoelectric sensor S is provided above an upper edge of the pool hopper 5 and at a height below the downstream end of the radiation trough 41. The photoelectric sensor S is disposed in the case 13 on which the radiation trough 41 is mounted, in such a state that a light emission surface faces the outside in an extension direction of the radiation trough 41.

When the article A is not detected by the photoelectric sensor S at a start of driving of the screw feeder 4, the control unit 20 drives the screw feeder 4 for the first period T1. When the article A is detected by the photoelectric sensor S at a start of driving of the screw feeder 4, the control unit 20 drives the screw feeder 4 for the second period T2 longer than the first period T1. For example, driving of the screw feeder 4 is started at a time immediately before output of a driving start signal to the screw feeder 4, a time immediately before driving of the screw feeder 4 for the first period T1 or the second period T2, and a time of an on-state of a driving flag of the screw feeder 4.

The first period T1 is a preset time Δt as expressed in a following equation. The first period T1 is set for each type of the article A. The first period T1 may be set for each shape and/or size of the article A, instead of or in addition to the type of the article A. The second period T2 is a period of the sum of the time Δt and an increment α as expressed in a following equation. The second period T2 is set for each type of the article A. The first period T1 may be set for each shape and/or size of the article A, instead of or in addition to the type of the article A. For example, the first period T1 and the second period T2 are stored in a storage section (ROM or RAM) of the control unit 20.

$$T1=\Delta t \quad T2=\Delta t+\alpha$$

When the article A is not held in the weighing hopper 6, the control unit 20 executes a discharging operation for discharging the article A held in the pool hopper 5 downstream. After executing the discharging operation of the pool hopper 5, the control unit 20 starts driving of the screw feeder 4. For example, the presence or absence of the article A held in the weighing hopper 6 can be determined based on output from the load cell 11a of the weighing unit 11 as described below.

An example of driving control of the screw feeder 4 executed by the control unit 20 will be now described.

Figure 4:
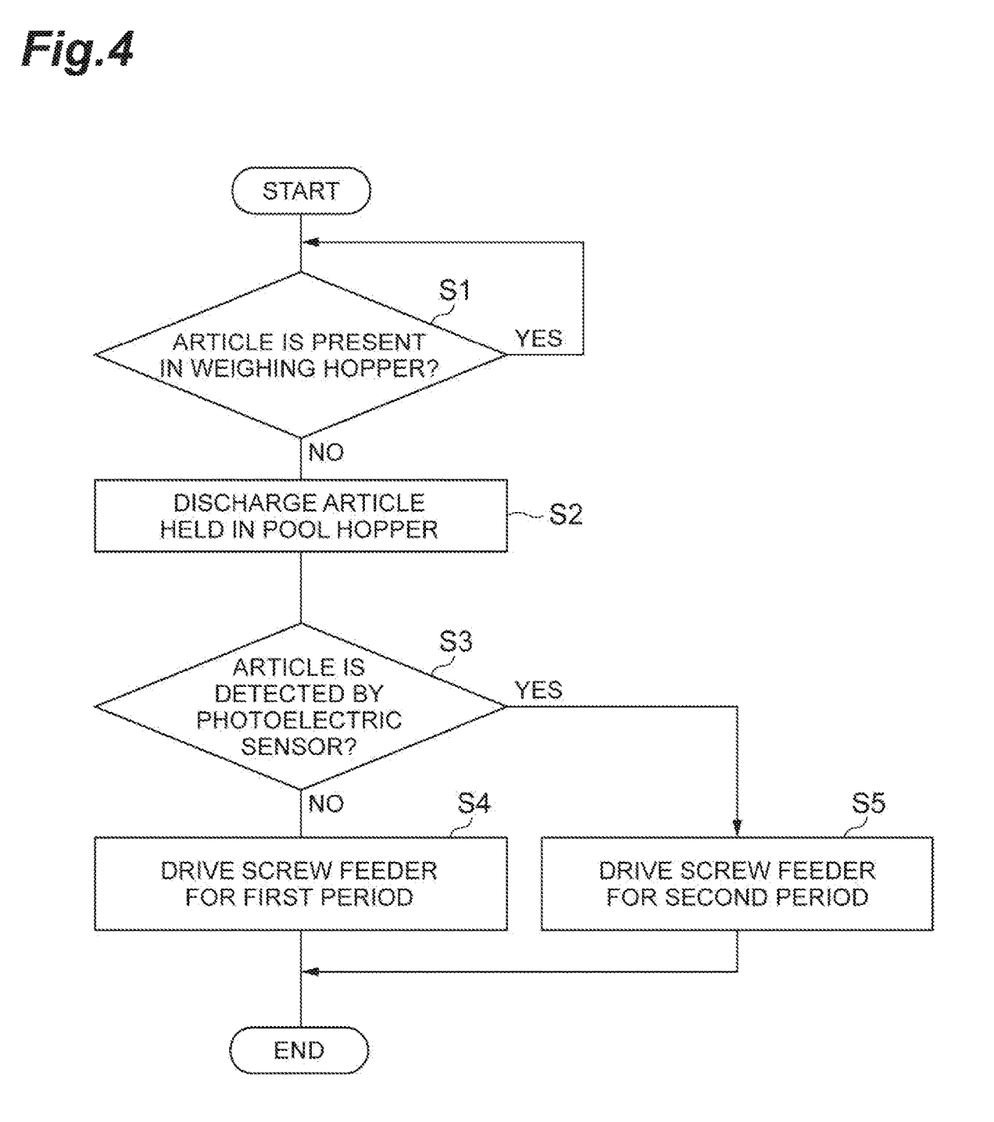
FIG. 4 is a flowchart showing an example of driving control of the screw feeder in FIG. 1.

Initially, as shown in FIG. 4, it is determined whether or not the article A is present (held) in the weighing hopper 6 based on the output from the load cell 11a of the weighing unit 11, for example (step S1). When YES in step S1, the process returns to the step S1 to repeatedly determine whether or not the article A is present in the weighing hopper 6. When NO in step S1, the gate 5a of the pool hopper 5 is opened to discharge the article A held in the pool hopper 5 (step S2).

It is determined whether or not the article A is detected by the photoelectric sensor S (whether or not detection is currently performed) based on a detection result of the photoelectric sensor S (step S3). When NO in step S3, the screw feeder 4 is driven for the first period T1 (step S4). When YES in step S3, the screw feeder 4 is driven for the second period T2 (step S5).

According to the combination weighing device 1 described above, the screw feeder 4 is driven for the first period T1 in a normal condition where the article A does not hang down from the conveyance end, for example, when the article A is not detected by the photoelectric sensor S at a start of driving of the screw feeder 4. In this manner, a specified amount of the articles A can be supplied to the pool hoppers 5. On the other hand, the screw feeder 4 is driven for the second period T2 longer than the first period T1 in an exceptional condition where the article A hangs down from the conveyance end, for example, when the article A is detected by the photoelectric sensor S at a start of driving of the screw feeder 4. In this manner, the article A can be securely supplied to the pool hopper 5. Accordingly, an appropriate amount of the articles A can be smoothly supplied to the pool hoppers 5.

According to the combination weighing device 1, the second period T2 is set for each type of the article A. Accordingly, an appropriate amount of the articles A can be smoothly supplied to the pool hoppers 5 in accordance with the type of the article A.

The combination weighing device 1 has the screw feeders 4 each including the screw 100 as a conveyance unit. The control unit 20 controls the rotation operation of the screw 100 of each of the screw feeders 4. In this case, the article A can be conveyed by the rotation operation of the screw 100. The article A can be conveyed in a desired manner by controlling the rotation operation of the screw 100.

In the combination weighing device 1, the screw feeder 4 conveys the article A in the radiation trough 41 by rotating the screw 100 disposed in the radiation trough 41. The pool hopper 5 receives the article A dropped from the downstream end of the radiation trough 41. The photoelectric sensor S emits light to a position below the downstream end of the radiation trough 41 on the pool hopper 5. A specific configuration capable of supplying an appropriate amount of the articles A to the pool hoppers 5 is therefore realizable.

According to the combination weighing device 1, the control unit 20 executes the discharging operation for discharging the article A held in the pool hopper 5 downstream when the article A is not retained in the weighing hopper 6. After execution of the discharging operation, driving of the screw feeder 4 is started. In this case, driving of the screw feeder 4 can be controlled in consideration of the holding situation of the weighing hopper 6.

According to the combination weighing device 1, the control unit 20 determines that the article A has been supplied from the screw feeder 4 to the pool hopper 5 when a state in which the photoelectric sensor S does not detect the article A has occurred after driving of the screw feeder 4 and detection of the article A by the photoelectric sensor S in the first period T1. On the other hand, driving of the screw feeder 4 is restarted when a state in which the photoelectric sensor S does not detect the article A has not occurred after driving of the screw feeder 4 and detection of the article A by the photoelectric sensor S in the first period T1. Accordingly, driving of the screw feeder 4 can be controlled while checking supply of the article A to the pool hopper 5 by driving of the screw feeder 4 in the first period T1 based on the detection result of the photoelectric sensor S.

According to the combination weighing device 1, the control unit 20 determines that the article A has been supplied from the screw feeder 4 to the pool hopper 5 when the photoelectric sensor S does not detect the article A after driving of the screw feeder 4 in the second period T2. On the other hand, the control unit 20 restarts driving of the screw feeder 4 when the photoelectric sensor S detects the article A after driving of the screw feeder 4 in the second period T2. Accordingly, driving of the screw feeder 4 can be controlled while checking supply of the article A to the pool hopper 5 by driving of the screw feeder 4 in the second period T2 based on the detection result of the photoelectric sensor S.

The combination weighing device 1 detects the article A between the conveyance end of the screw feeder 4 and the pool hopper 5 by using the photoelectric sensor S. In this configuration, supply of a specified amount (e.g., one) of the articles A from the screw feeder 4 to the pool hopper 5 can be easily and inexpensively checked based on the detection result of the photoelectric sensor S.

While the embodiment according to one aspect of the present invention has been described, one aspect of the present invention is not limited to the embodiment described herein. The conveyance unit according to one aspect of the present invention is not limited to the dispersion feeder 3 and the plurality of screw feeders 4 described above, but may be any unit which has a configuration capable of conveying the article A. The hoppers according to one aspect of the present invention are not limited to hoppers annularly disposed, but may be hoppers disposed in matrix. The combination weighing device according to one aspect of the present invention is not required to include the plurality of booster hoppers 7.

When the photoelectric sensor S detects the article A after an elapse of a predetermined waiting time from driving of the screw feeder 4 in the above embodiment, the control unit 20 may restart driving of the screw feeder 4. The predetermined waiting time may be set in advance and stored in the storage section (ROM or RAM) of the control unit 20. For example, the predetermined waiting time may be set in consideration of a point that the article A does not immediately drop, and may be a period such as a short time.

Figure 5:
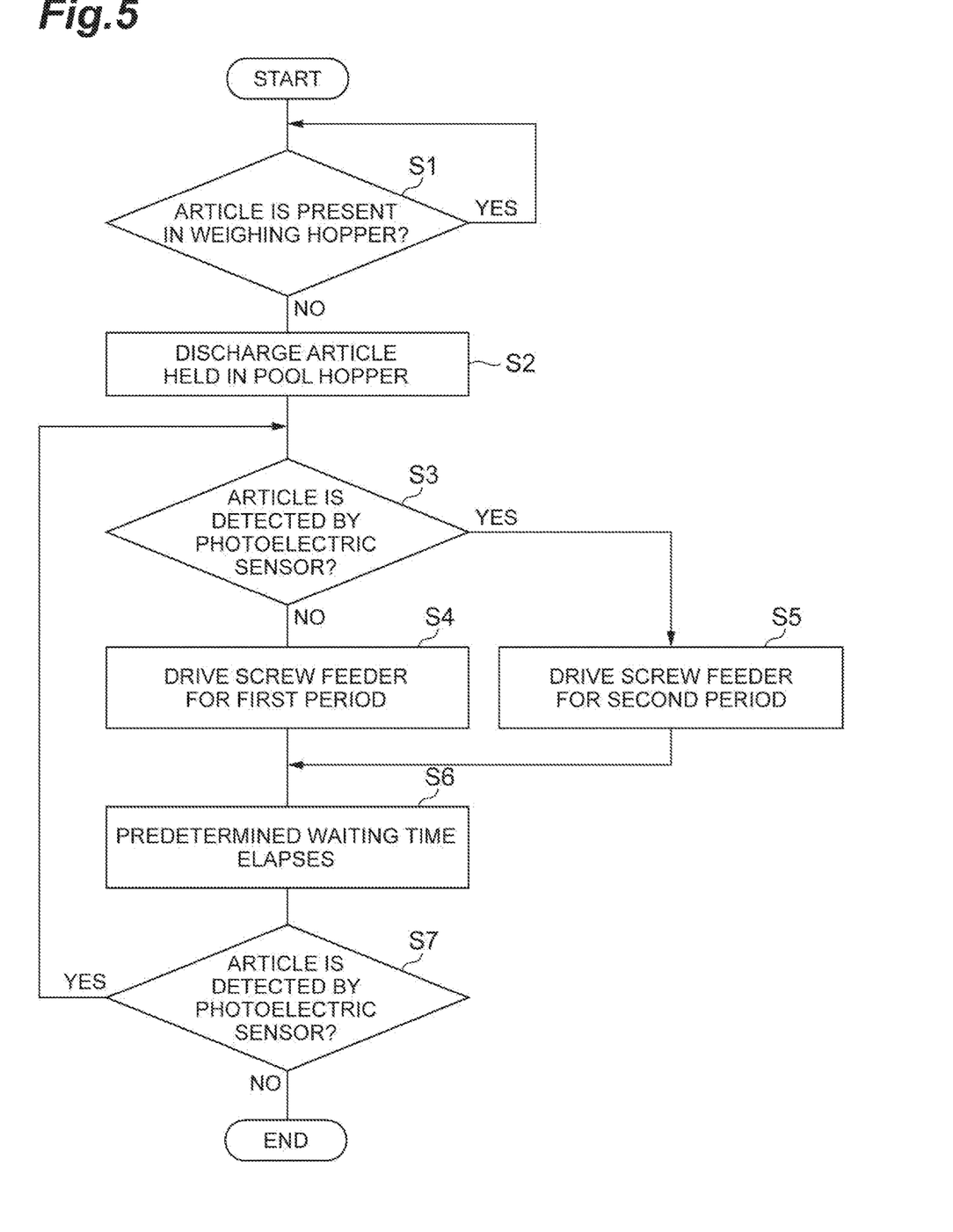
FIG. 5 is a flowchart showing another example of driving control of the screw feeder in FIG. 1.

In this case, as shown in FIG. 5, driving control of the screw feeder 4 determines whether or not the article A has been detected by the photoelectric sensor S after the elapse of the waiting time and after step S4 described above or step S5 described above (steps S6 and S7). When YES in step S7, the process returns to processing in step S3 so as to restart driving of the screw feeder 4. When NO in step S6, a series of processing in the current control cycle is ended. Thereafter, the process shifts to step S1 described above in the next control cycle, for example.

In this manner, control which gives priority to supplying (feeding) the article A to the pool hopper 5 is achievable. Moreover, the predetermined waiting time thus provided is appropriate for an actual situation that a certain time is required to determine that the article A has dropped (completely dropped) from the screw feeder 4.

Provided according to one aspect of the present invention is a weighing device capable of smoothly supplying an appropriate amount of articles to hoppers.

What is claimed is:

1. A weighing device comprising:
    a conveyance unit configured to convey an article;
    a hopper configured to receive the article conveyed by the conveyance unit, temporarily hold the received article, and then discharge the article downstream;
    a detection unit configured to detect the article between a conveyance end of the conveyance unit and the hopper; and
    a control unit configured to control driving of the conveyance unit;
    wherein
    the control unit drives the conveyance unit for a first period when the detection unit does not detect the article at a start of driving of the conveyance unit, and
    the control unit drives the conveyance unit for a second period longer than the first period when the detection unit detects the article at a start of driving of the conveyance unit.

2. The weighing device according to claim 1, wherein the second period is set for each type of the article.

3. The weighing device according to claim 1, wherein
    the conveyance unit has a screw feeder configured to include a screw constituted of a linear member, and
    the control unit controls a rotation operation of the screw of the screw feeder.

4. The weighing device according to claim 3, wherein
    the conveyance unit conveys the article in the radiation trough by rotating the screw disposed in the radiation trough,
    the hopper receives the article dropped from a downstream end of the radiation trough, and
    the detection unit is a photoelectric sensor configured to emit light to a position below the downstream end of the radiation trough on the hopper.

5. The weighing device according to claim 1, further comprising a different hopper disposed on a downstream side of the hopper, and configured to receive the article discharged from the hopper, temporarily hold the received article, and then discharge the article downstream,
    wherein
    the control unit executes a discharging operation for discharging the article held in the hopper downstream when the article is not held in the different hopper, and
    the control unit starts driving of the conveyance unit after execution of the discharging operation.

6. The weighing device according to claim 1, wherein the control unit restarts driving of the conveyance unit when the detection unit detects the article after an elapse of a predetermined waiting time from driving of the conveyance unit.

* * * * *